United States Patent
Tsai

(10) Patent No.: US 8,009,091 B2
(45) Date of Patent: Aug. 30, 2011

(54) METHOD AND APPARATUS FOR REDUCING TIME TO FIRST FIX (TTFF) OF GNSS RECEIVER WITHOUT ACCURATE TIME INFORMATION

(75) Inventor: Chien-Liang Tsai, Taipei County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 279 days.

(21) Appl. No.: 12/328,753

(22) Filed: Dec. 4, 2008

(65) Prior Publication Data

US 2010/0141522 A1    Jun. 10, 2010

(51) Int. Cl.
*G01S 19/25* (2010.01)
*G01S 19/09* (2010.01)

(52) U.S. Cl. .............. 342/357.64; 342/357.46

(58) Field of Classification Search ............ 342/357.25, 342/357.46, 357.62, 357.64, 357.66; 701/213, 701/215

See application file for complete search history.

(56) References Cited

U.S. PATENT DOCUMENTS

| 5,893,044 A * | 4/1999 | King et al. | 701/214 |
| 2005/0168382 A1* | 8/2005 | Awata | 342/357.02 |
| 2006/0152409 A1* | 7/2006 | Raman et al. | 342/357.15 |
| 2007/0268180 A1* | 11/2007 | Zhi et al. | 342/357.12 |

\* cited by examiner

*Primary Examiner* — Dao L Phan
(74) *Attorney, Agent, or Firm* — Winston Hu; Scott Margo

(57) ABSTRACT

A method for reducing Time To First Fix (TTFF) of a Global Navigation Satellite System (GNSS) receiver includes storing ephemeris information into a non-volatile memory, and utilizing the ephemeris information to determine a GNSS time, in order to reduce the TTFF. An apparatus for reducing TTFF of a GNSS receiver includes a storage module and a processing module coupled to the storage module. The storage module is utilized for storing data, wherein the stored data in the storage module is non-volatile. The processing module stores ephemeris information into the storage module and utilizes the ephemeris information to determine a GNSS time, in order to reduce the TTFF.

20 Claims, 2 Drawing Sheets

METHOD AND APPARATUS FOR REDUCING TIME TO FIRST FIX (TTFF) OF GNSS RECEIVER WITHOUT ACCURATE TIME INFORMATION

BACKGROUND

The present invention relates to Global Navigation Satellite System (GNSS) receivers, and more particularly, to a method and apparatus for reducing Time To First Fix (TTFF) of a GNSS receiver without accurate time information.

One of the most important issues related to GNSS receivers is how to obtain accurate GNSS time when a GNSS receiver enters a start-up mode from a power-off mode. Typically, within a conventional GNSS receiver, all components except a real time clock (RTC) are powered down in the power-off mode. According to the related art, a common way to get an initial GNSS time when the GNSS receiver is powered on is by reading the RTC time from the RTC and by performing further calculations. After deriving the initial GNSS time for the start-up mode, some initialization operations may be performed accordingly. Whether the initial GNSS time is accurate or not may influence the TTFF of the GNSS receiver.

As most operations before the TTFF of the conventional GNSS receiver (e.g. the initialization operations mentioned above) are based on the RTC, the RTC has become an essential component of the conventional GNSS receiver. As a result, any damage or power failure of the RTC will certainly cause malfunction or lower performance of the GNSS receiver implemented according to the related art. In addition, the corresponding material costs of the RTC will always be included in the overall cost list of the manufacturer.

Additionally, a button battery is typically required for powering the RTC during the power-off mode. The button battery is harmful to the environment, however, causing the conventional GNSS receiver to be environmentally-unfriendly. Some end users may feel ashamed of having yet another environmentally-unfriendly product like this.

SUMMARY

It is therefore an objective of the claimed invention to provide a method and apparatus for reducing Time To First Fix (TTFF) of a Global Navigation Satellite System (GNSS) receiver without accurate time information to solve the above-mentioned problem.

It is another objective of the claimed invention to provide a method and apparatus for reducing TTFF of a GNSS receiver without a real time clock (RTC) and a button battery, in order to lower costs and be slightly more environmentally friendly.

An exemplary embodiment of a method for reducing TTFF of a GNSS receiver comprises storing ephemeris information into a non-volatile memory before powering down the GNSS receiver, and utilizing the ephemeris information to determine a GNSS time in order to reduce the TTFF when resuming the GNSS receiver.

An exemplary embodiment of an apparatus for reducing TTFF of a GNSS receiver comprises a storage module and a processing module coupled to the storage module. The storage module is utilized for storing data, wherein the stored data in the storage module is non-volatile. The processing module stores ephemeris information into the storage module before powering down the GNSS receiver, and utilizes the ephemeris information to determine a GNSS time, in order to reduce the TTFF when resuming the GNSS receiver.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
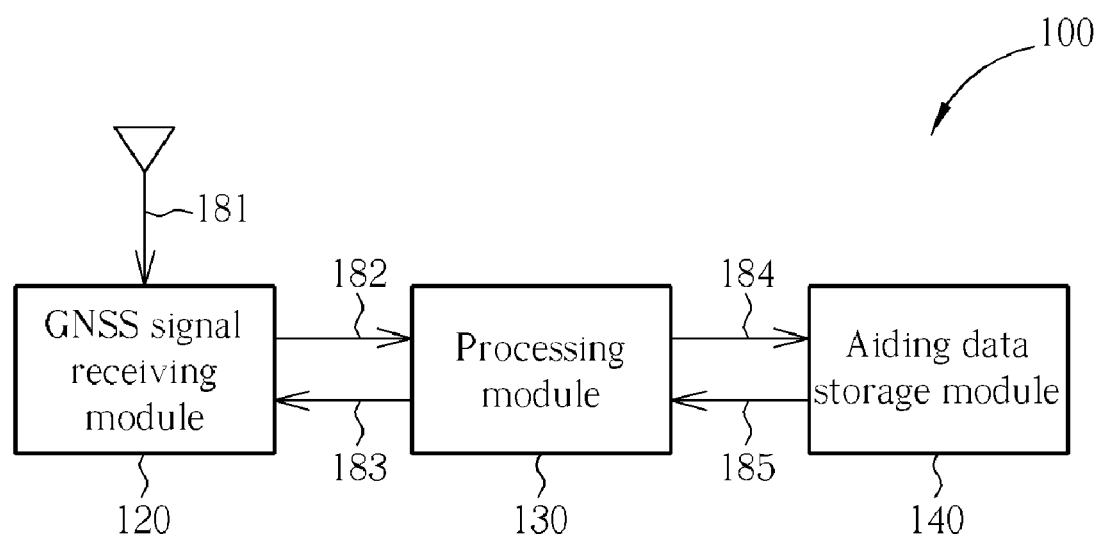
FIG. 1 is a diagram of an apparatus for reducing Time To First Fix (TTFF) of a Global Navigation Satellite System (GNSS) receiver according to one embodiment of the present invention.

Please refer to FIG. 1. FIG. 1 is a diagram of an apparatus 100 for reducing Time To First Fix (TTFF) of a Global Navigation Satellite System (GNSS) receiver according to a first embodiment of the present invention. The apparatus 100 comprises a GNSS signal receiving module 120 such as a baseband circuit (not shown) coupled to a radio frequency (RF) module, a processing module 130 such as a processor, and an aiding data storage module 140 such as a non-volatile memory, where various modifications may be applied. The apparatus 100 may represent the GNSS receiver in one embodiment of the present invention. In another embodiment of the present invention, the apparatus 100 may represent a portion of the GNSS receiver: for example, a circuit implemented with one or more chips. In another embodiment of the present invention, the apparatus 100 may comprise the GNSS receiver. For example, the apparatus 100 can be a multi-function device comprising a cellular phone function, a personal digital assistant (PDA) function, and the GNSS receiver function.

In addition, according to different embodiments of the present invention, at least a portion of the apparatus 100 can be integrated into a single module. For example, among the GNSS signal receiving module 120, the processing module 130, and the aiding data storage module 140, one component may be coupled to another component through a terminal, or embedded into another component. Additionally, according to some embodiments of the present invention, some portions of the apparatus 100 can be implemented with distributed modules that are coupled through communications links complying with specific protocols.

Figure 2:
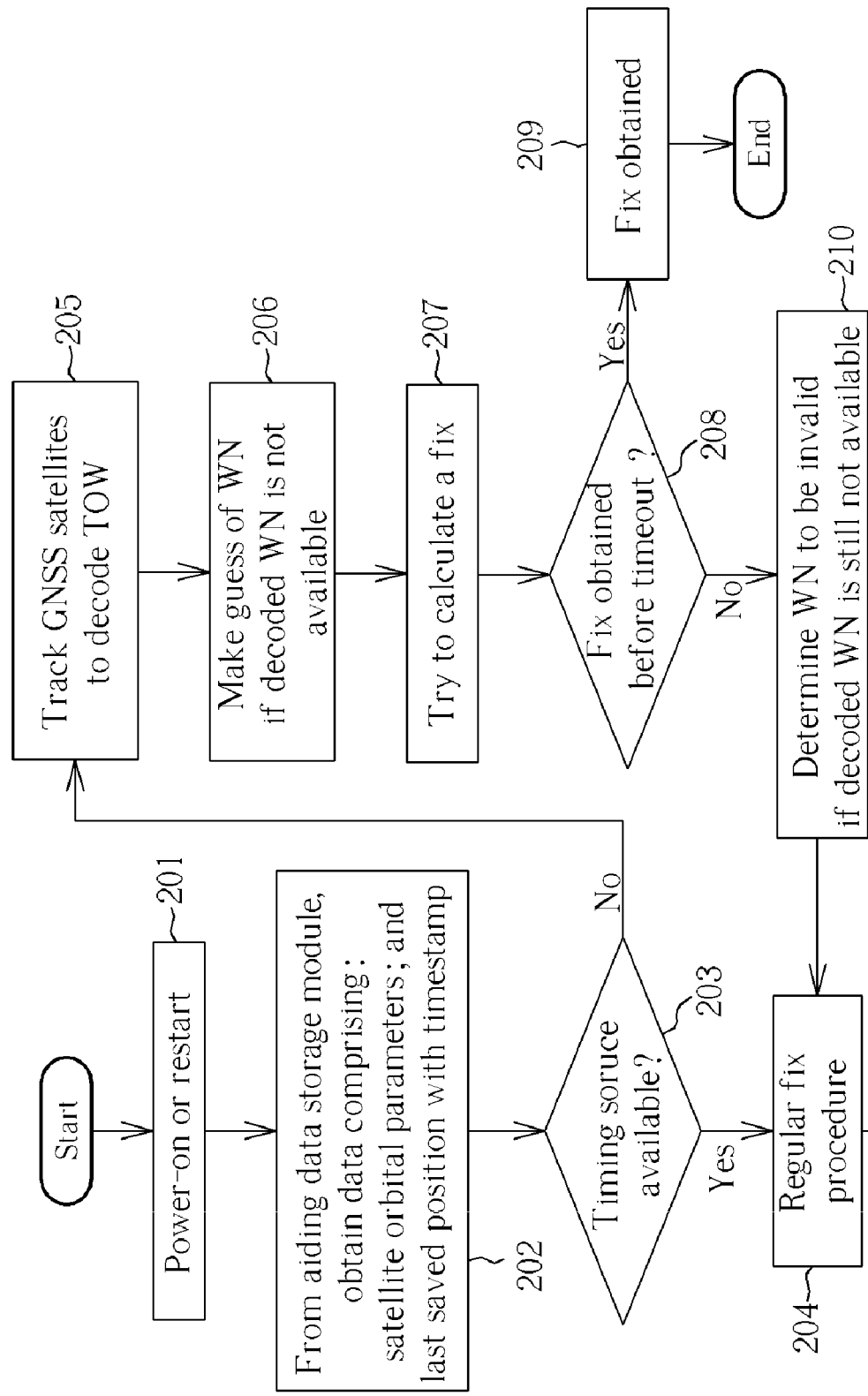
FIG. 2 is a flowchart of a method for reducing TTFF of a GNSS receiver according to one embodiment of the present invention.

FIG. 2 is a flowchart of a method for reducing TTFF of a GNSS receiver according to one embodiment of the present invention. The method shown in FIG. 2 can be applied to the apparatus 100 and implemented by utilizing the apparatus 100, and can be described as follows.

According to the first embodiment, the GNSS signal receiving module 120 tracks and demodulates GNSS signals 181, which are wirelessly received through an antenna from GNSS satellite(s) (not shown), sends demodulated satellite orbital parameters 182 to the processing module 130, and further receives time and frequency ranges 183 from the processing module 130. In addition, the processing module 130 calculates the GNSS receiver's current position and time. The processing module 130 stores data 184 into the aiding data storage module 140, where the stored data in the aiding data storage module 140 is non-volatile, and typically comprises satellite orbital parameters and the GNSS receiver's position information with at least one timestamp. This is for illustrative purposes only, and is not meant to be a limitation of the present invention. According to a variation of this embodiment, the stored data in the aiding data storage module 140 typically comprises satellite orbital parameters and at least one timestamp with optional position information of the GNSS receiver of this variation.

More particularly, the data 184 comprises ephemeris information. In contrast to this, storing the ephemeris information into a non-volatile memory before powering down the GNSS receiver as suggested in this embodiment is not seen in any conventional GNSS receiver. In practice, the aiding data storage module 140 can be implemented with the same flash memory storing a program code for the processing module 130, where the data 184 and the program code can be stored in different portions of the flash memory. The ephemeris information can be stored in a dedicated region within the portion for storing the data 184.

The flowchart shown in FIG. 2 starts from a power-on or restart (Step 201) of the GNSS receiver. From the aiding data storage module 140, the processing module 130 obtains/loads data 185 comprising satellite orbital parameters and the last saved position information with the timestamp (Step 202). More particularly, the data 185 comprises the latest ephemeris information, where the processing module 130 utilizes the ephemeris information to determine a GNSS time, in order to reduce the TTFF when resuming the GNSS receiver of this embodiment.

In a situation where the apparatus 100 represents a portion of the GNSS receiver (for example, a circuit implemented with one or more chips), the processing module 130 may represent a chip for being utilized or purchased by a system manufacturer. In order to satisfy various requirements from different system manufacturers (i.e., the clients of the chip manufacturer), it is suggested according to the embodiment that a checking step such as Step 203 be involved. When a timing source such as a real time clock (RTC) is available, Step 204 is entered to perform a regular fix procedure; otherwise, Step 205 is executed. Starting from Step 205, the processing module 130 may determine the GNSS time without referencing an RTC. By applying the method shown in FIG. 2, system manufacturers do not need to utilize or purchase an RTC, and a button battery for powering an RTC has therefore become an unnecessary component. This helps with cost-saving and environmental protection.

More specifically, the processing module 130 tracks GNSS satellites to decode a new value of Time Of Week (TOW) while deriving an old value of TOW from the timestamp (Step 205), and makes a guess of a new value of Week Number (WN) according to the new value of TOW and the old value of TOW when the new value of WN is not decoded (Step 206). Specifically, when the new value of WN is not decoded, the processing module 130 makes a guess of the new value of WN according to a comparison result between the new value of TOW and the old value of TOW. In this embodiment, when the new value of TOW is greater than the old value of TOW, the processing module 130 determines the new value of WN to be substantially the same as an old value of WN from the timestamp; otherwise, the processing module 130 determines the new value of WN to be substantially equal to the old value of WN plus one.

Furthermore, the processing module 130 determines whether the ephemeris information is expired. When the ephemeris information is not expired, the processing module 130 tries to calculate a fix according to the new value of TOW and the new value of WN (Step 207). Thus, in a checking step such as Step 208, it is checked whether a fix is obtained before the timeout. When a fix is obtained before timeout, Step 209 is entered, meaning the processing module 130 may have reduced the TTFF by correctly guessing the WN without decoding it; otherwise, Step 210 is entered, and the processing module 130 determines WN to be invalid if the decoded WN is still not available, so Step 204 is then entered to perform the regular fix procedure.

Please note that according to current standards, as WN information appears every 5 sub-frames (e.g., 30 seconds in this embodiment) and as TOW information appears every sub-frame (e.g., 5 seconds in this embodiment), making a guess of the new value of WN saves time, where the saved time may reach up to 25 seconds.

According to a variation of this embodiment, in Step 206, a tolerance value may be applied to the comparison mentioned above. For example, when the new value of TOW is greater than the old value of TOW plus the tolerance value, the processing module 130 determines the new value of WN to be substantially the same as an old value of WN from the timestamp; otherwise, meaning the new value of TOW is equal to or less than the old value of TOW plus the tolerance value, the processing module 130 determines the new value of WN to be substantially equal to the old value of WN plus one.

It is an advantage of the claimed invention that the present invention method and apparatus may reduce the TTFF by making a guess of the new value of WN, instead of waiting for the WN information and then decoding the WN.

In contrast to the related art, the present invention method and apparatus is capable of determining, particularly after a power-on or restart, the GNSS time without referencing an RTC. This helps on cost-saving and environmental protection.

Those skilled in the art will readily observe that numerous modifications and alterations of the device and method may be made while retaining the teachings of the invention.

What is claimed is:

1. A method for reducing Time To First Fix (TTFF) of a Global Navigation Satellite System (GNSS) receiver, comprising:
    storing ephemeris information into a non-volatile memory before powering down the GNSS receiver; and
    utilizing the ephemeris information to determine a GNSS time without referencing a real time clock (RTC), in order to reduce the TTFF when resuming the GNSS receiver.

2. The method of claim 1, wherein the step of utilizing the ephemeris information to determine the GNSS time further comprises:
    after a power-on or restart, determining the GNSS time without referencing any RTC.

3. The method of claim 1, further comprising:
    storing at least one timestamp with optional position information into the non-volatile memory; and
    after a power-on or restart, tracking GNSS satellites to decode a new value of Time Of Week (TOW), deriving an old value of TOW from the timestamp, and making a guess of a new value of Week Number (WN) according to the new value of TOW and the old value of TOW when the new value of WN is not decoded.

4. The method of claim 3, wherein the step of making the guess of the new value of WN further comprises:
when the new value of WN is not decoded, making the guess of the new value of WN according to a comparison result between the new value of TOW and the old value of TOW.

5. The method of claim 4, wherein the step of making the guess of the new value of WN further comprises:
when the new value of TOW is greater than the old value of TOW, determining the new value of WN to be substantially the same as an old value of WN from the timestamp; otherwise, determining the new value of WN to be substantially equal to the old value of WN plus one.

6. The method of claim 3, further comprising:
determining whether the ephemeris information is expired; and
when the ephemeris information is not expired, trying to calculate a fix according to the new value of TOW and the new value of WN.

7. An apparatus for reducing Time To First Fix (TTFF) of a Global Navigation Satellite System (GNSS) receiver, comprising:
a storage module for storing data, wherein the stored data in the storage module is non-volatile; and
a processing module, coupled to the storage module, for storing ephemeris information into the storage module before powering down the GNSS receiver, and utilizing the ephemeris information to determine a GNSS time without referencing a real time clock (RTC), in order to reduce the TTFF when resuming the GNSS receiver.

8. The apparatus of claim 7, wherein the storage module comprises a non-volatile memory for storing the ephemeris information.

9. The apparatus of claim 7, wherein the apparatus comprises the GNSS receiver.

10. The apparatus of claim 7, wherein the apparatus is a circuit positioned within the GNSS receiver.

11. The apparatus of claim 7, wherein after a power-on or restart, the processing module determines the GNSS time without referencing an RTC.

12. The apparatus of claim 7, the processing module further stores position information with at least one timestamp into the storage module; and after a power-on or restart, the processing module tracks GNSS satellites to decode a new value of Time Of Week (TOW), derives an old value of TOW from the timestamp, and makes a guess of a new value of Week Number (WN) according to the new value of TOW and the old value of TOW when the new value of WN is not decoded.

13. The apparatus of claim 12, wherein when the new value of WN is not decoded, the processing module makes a guess of the new value of WN according to a comparison result between the new value of TOW and the old value of TOW.

14. The apparatus of claim 13, wherein when the new value of TOW is greater than the old value of TOW, the processing module determines the new value of WN to be substantially the same as an old value of WN from the timestamp; otherwise, the processing module determines the new value of WN to be substantially equal to the old value of WN plus one.

15. The apparatus of claim 12, wherein the processing module determines whether the ephemeris information is expired; and when the ephemeris information is not expired, the processing module tries to calculate a fix according to the new value of TOW and the new value of WN.

16. A method for reducing Time To First Fix (TTFF) of a Global Navigation Satellite System (GNSS) receiver, comprising:
storing at least one timestamp with optional position information into the non-volatile memory before powering down the GNSS receiver; and
when resuming the GNSS receiver, tracking GNSS satellites to decode a new value of Time Of Week (TOW), deriving an old value of TOW from the timestamp, and making a guess of a new value of Week Number (WN) according to the new value of TOW and the old value of TOW when the new value of WN is not decoded.

17. The method of claim 16, wherein the step of making the guess of the new value of WN further comprises:
when the new value of WN is not decoded, making the guess of the new value of WN according to a comparison result between the new value of TOW and the old value of TOW.

18. The method of claim 17, wherein the step of making the guess of the new value of WN further comprises:
when the new value of TOW is greater than the old value of TOW, determining the new value of WN to be substantially the same as an old value of WN from the timestamp; otherwise, determining the new value of WN to be substantially equal to the old value of WN plus one.

19. The method of claim 16, further comprising:
determining whether the ephemeris information is expired; and
when the ephemeris information is not expired, trying to calculate a fix according to the new value of TOW and the new value of WN.

20. An apparatus for reducing Time To First Fix (TTFF) of a Global Navigation Satellite System (GNSS) receiver, comprising:
a storage module for storing data, wherein the stored data in the storage module is non-volatile; and
a processing module, coupled to the storage module, for storing ephemeris information into the storage module before powering down the GNSS receiver, and utilizing the ephemeris information to determine a GNSS time, in order to reduce the TTFF when resuming the GNSS receiver;
wherein the processing module further stores position information with at least one timestamp into the storage module; and after a power-on or restart, the processing module tracks GNSS satellites to decode a new value of Time Of Week (TOW), derives an old value of TOW from the timestamp, and makes a guess of a new value of Week Number (WN) according to the new value of TOW and the old value of TOW when the new value of WN is not decoded.

* * * * *